United States Patent [19]
Kim

[11] Patent Number: 5,921,491
[45] Date of Patent: Jul. 13, 1999

[54] ANTI-REVERSE DRAG MECHANISM

[75] Inventor: Hyunkyu Kim, Broken Arrow, Okla.

[73] Assignee: Brunswick Corporation, Tulsa, Okla.

[21] Appl. No.: 08/851,119

[22] Filed: May 5, 1997

[51] Int. Cl.$^6$ .................................................. A01K 89/015
[52] U.S. Cl. ............................................................... 242/268
[58] Field of Search ..................................... 242/267, 268, 242/259, 260, 261

[56] References Cited

U.S. PATENT DOCUMENTS

| | | | |
|---|---|---|---|
| 1,554,786 | 9/1925 | Case | 242/268 |
| 2,146,582 | 2/1939 | Kohlhepp | 242/268 |
| 3,612,437 | 10/1971 | Allebach | 242/268 |
| 3,971,530 | 7/1976 | Murvall | 242/268 |
| 4,512,536 | 4/1985 | Sato . | |
| 4,763,856 | 8/1988 | Kaneko . | |
| 4,878,633 | 11/1989 | Morimoto . | |
| 5,071,086 | 12/1991 | Roberts et al. . | |
| 5,149,009 | 9/1992 | Sato . | |
| 5,292,087 | 3/1994 | Sato . | |
| 5,318,244 | 6/1994 | Morimoto . | |
| 5,322,240 | 6/1994 | Sato . | |
| 5,379,959 | 1/1995 | Sato . | |

FOREIGN PATENT DOCUMENTS

| | | | |
|---|---|---|---|
| 2 246 693 | 2/1992 | United Kingdom | 242/268 |
| 2 251 535 | 7/1992 | United Kingdom | 242/268 |

*Primary Examiner*—Katherine Matecki
*Attorney, Agent, or Firm*—Wood, Phillips, VanSanten, Clark & Mortimer

[57] ABSTRACT

An improved fishing reel of the type having a reel frame, a line-carrying spool rotatably mounted relative to the frame, a crankshaft rotatably mounted relative to the frame, a driving gear rotatably mounted relative to the crankshaft and selectively responsive to rotation of the crankshaft to drive the spool, and a drag mechanism for frictionally engaging the driving gear and causing the driving gear to slippingly follow rotation of the crankshaft. The drag mechanism includes a drag washer mounted to the crankshaft and axially slidable thereon, the drag washer selectively frictionally engaging the driving gear, a link keyed to the crankshaft for rotation therewith and axially slidable thereon, the link being keyed to the drag washer, a clutch sleeve mounted to the crankshaft and axially slidable thereon, the clutch sleeve being keyed to the link, and a drag input structure operably mounted on the crankshaft for inputting a drag force to the clutch sleeve, whereby the drag force is transferred from the clutch sleeve to the link to the drag washer and applied to the driving gear to thereby cause the driving gear to be slippingly held to the crankshaft for rotation with the crankshaft.

15 Claims, 6 Drawing Sheets

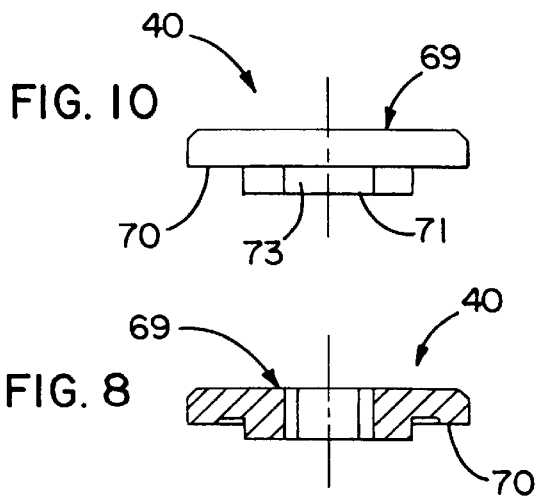
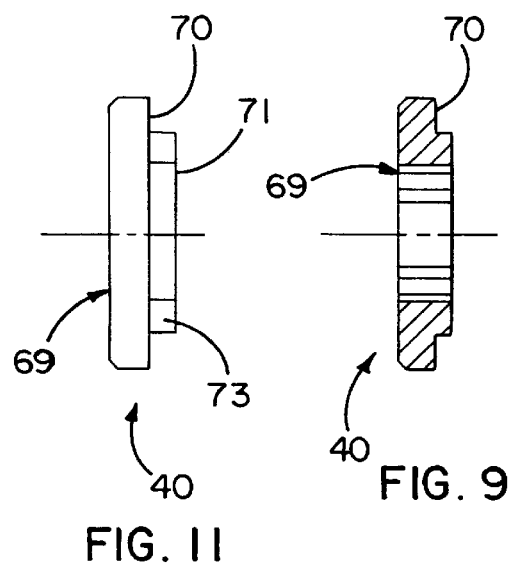
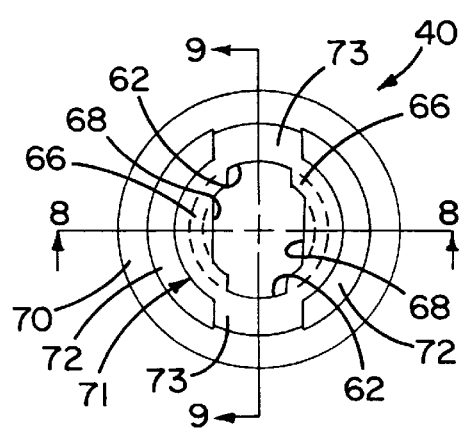
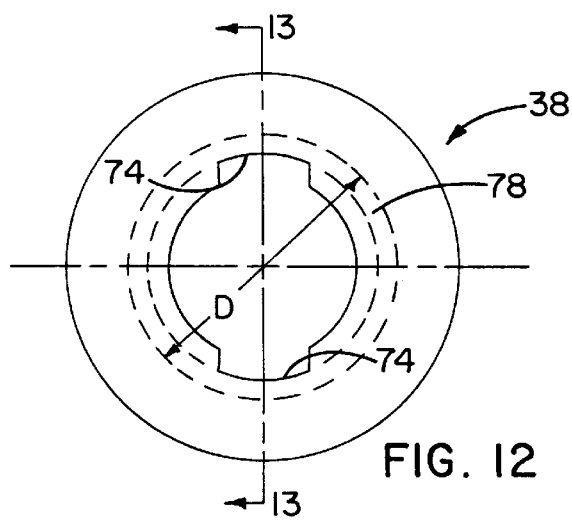
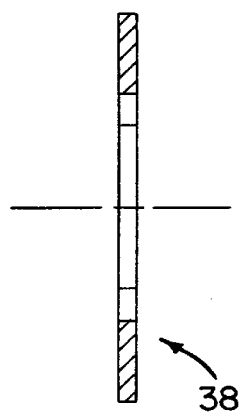

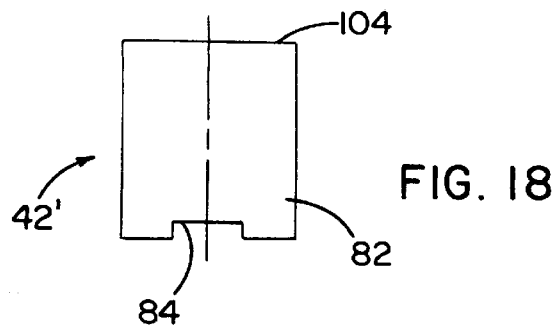
FIG. 18
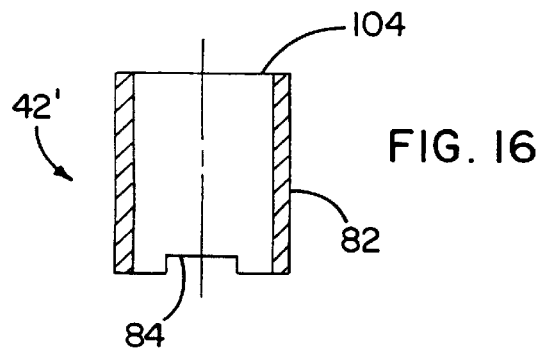
FIG. 16
FIG. 17
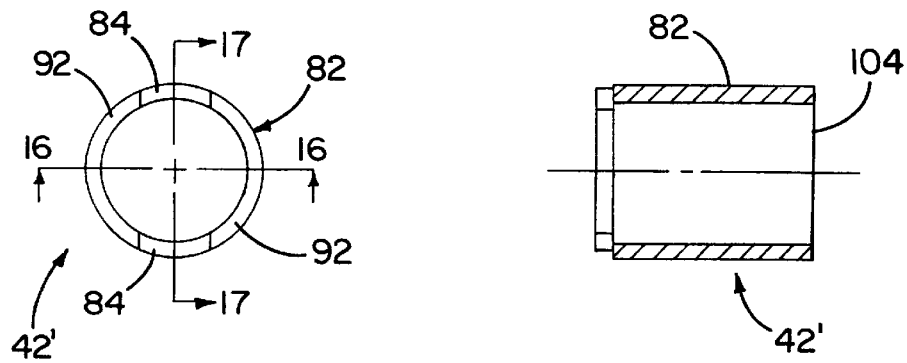
FIG. 15
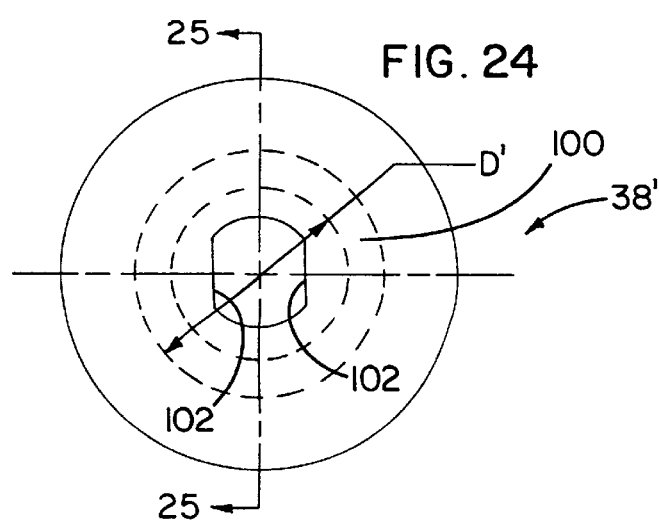
FIG. 24
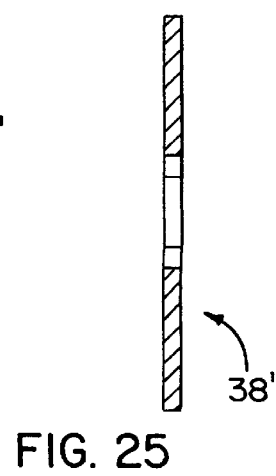
FIG. 25

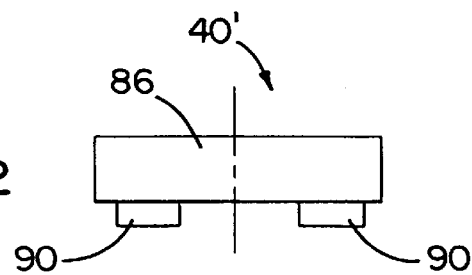
FIG. 22
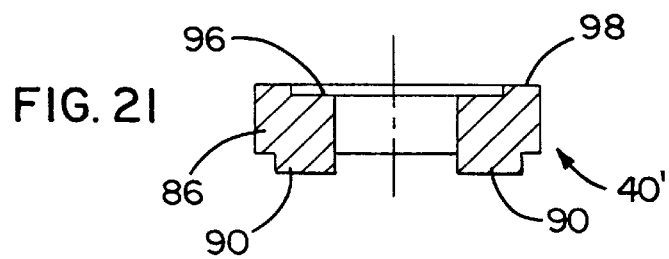
FIG. 21
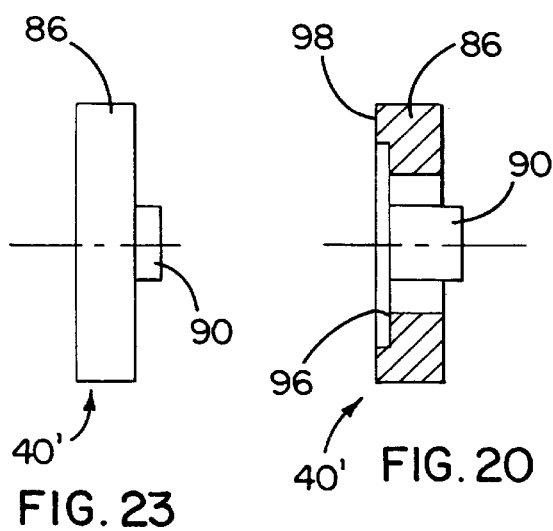
FIG. 23
FIG. 20
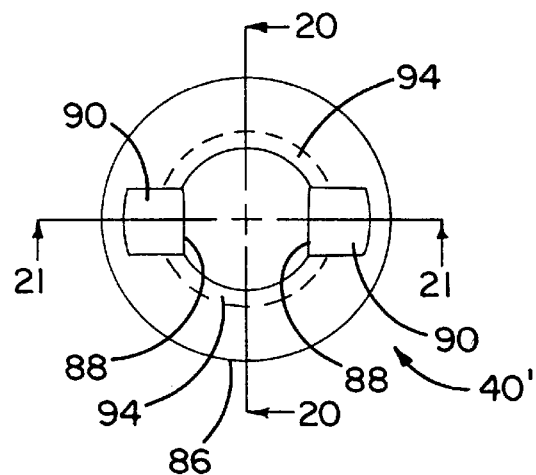
FIG. 19

ANTI-REVERSE DRAG MECHANISM

FIELD OF THE INVENTION

The present invention pertains to fishing reels and, more particularly, to a system for selectively controlling the reel drag.

BACKGROUND OF THE INVENTION

In almost every type of fishing reel currently manufactured, a structure is provided for applying a variable drag force to a line-carrying spool so that any pull on the line in the direction of line pay-out, such as normally occurs when a fish bites, in excess of that to which the drag is set for, will cause the spool to turn.

One conventional drag apparatus, such as found in bait casting reels, includes a drag washer normally keyed on an end portion of a crankshaft such that the drag washer rotates with the crankshaft. A handle is normally keyed on the other end of the crankshaft, whereby rotating the handle will rotate the crankshaft. The drag washer will generally have a friction pad facing axially and in friction-engaging contact with one face of a driving gear. The driving gear is freely rotatably and axially movable on the crankshaft, and meshes with an input gear on a spool shaft. A ratchet wheel is normally secured to the crankshaft so as to rotate with, but is prohibited from axial movement on, the crankshaft. Generally, a friction pad is mounted on an axial face of the ratchet wheel for friction-engaging contact with the other face of the driving gear.

In bait casting reels with a one-way clutch, which prevents backward turning of the handle, the drag washer is generally forced against the driving gear by a clutch sleeve which is normally keyed to the crankshaft for rotation therewith. The clutch sleeve is normally forced against the drag washer, via a drag adjustment knob on the crankshaft, so as to create a sufficient frictional force on either side of the driving gear to rotate the driving gear to retrieve line onto the spool, and also to set the drag to an appropriate setting.

SUMMARY OF THE INVENTION

A fishing reel is provided having a frame, a line-carrying spool rotatably mounted relative to the frame, a crankshaft rotatably mounted relative to the frame, a driving gear rotatably mounted relative to the crankshaft and selectively responsive to the rotation of the crankshaft to drive the spool, and a drag mechanism for frictionally engaging the driving gear and causing the driving gear to slippingly follow rotation of the crankshaft.

In one form, the drag mechanism may include a drag washer mounted to the crankshaft and axially slidable thereon, the drag washer selectively frictionally engaging the driving gear, a link keyed to the crankshaft for rotation therewith and axially slidable thereon, the link being keyed to the drag washer, a clutch sleeve mounted to the crankshaft and axially slidable thereon, the clutch sleeve being keyed to the link, and a drag input structure operably mounted on the crankshaft for inputting a drag force to the clutch sleeve, whereby the drag force is transferred from the clutch sleeve to the link to the drag washer and applied to the driving gear to thereby cause the driving gear to be slippingly held to the crankshaft for rotation with the crankshaft.

The clutch sleeve may include a cylindrical shell having at least one leg extending axially therefrom and received in at least one complementary recess formed in the link.

The link may include a disc-shaped member having at least one leg extending axially therefrom and received in at least one complementary recess formed in the drag washer.

In another form, the drag mechanism may include a drag washer keyed to the crankshaft for rotation therewith and axially slidable thereon, the drag washer selectively frictionally engaging the driving gear, a link keyed to the crankshaft for rotation therewith and axially slidable thereon, the link selectively frictionally engaging the drag washer, a clutch sleeve mounted to the crankshaft and axially slidable thereon, the clutch sleeve being keyed to the link, and a drag input structure operably mounted on the crankshaft for inputting a drag force to the clutch sleeve, whereby the drag force is transferred from the clutch sleeve to the link to the drag washer and applied to the driving gear to thereby cause the driving gear to be slippingly held to the crankshaft for rotation with the crankshaft.

The clutch sleeve may include a cylindrical shell having at least one axial recess in an end thereof for receiving at least one complementary leg extending axially from the link.

The link may include a disc-shaped member having opposite faces, with the at least one complementary leg extending axially from one of the opposite faces and the other of the opposite faces frictionally engaging the drag washer.

The opposite face of the link engaging the drag washer may include an annular shoulder defined by outer and inner peripheral portions, with the outer peripheral portion extending axially from the inner peripheral portion and frictionally engaging the drag washer.

The drag input structure may include a drag-actuating knob threaded on the crankshaft for adjustably setting the drag force, and a pair of belleville springs provided between the drag-actuating knob and clutch sleeve for controllably biasing the clutch sleeve toward the driving gear.

The above and other novel features of the present invention will be more fully apparent from the following detailed description when the same is read in connection with the accompanying drawings.

BRIEF DESCRIPTION OF THE DRAWINGS

FIG. 7 is a side elevation view of the link incorporated in the first embodiment of the present invention;

FIG. 8 is a cross-sectional view of the link taken along line 8—8 in FIG. 6;

FIG. 9 is a cross-sectional view of the link taken along line 9—9 in FIG. 6;

FIG. 10 is a front elevation view of the link incorporated in the first embodiment of the present invention;

FIG. 11 is a front elevation view of the link incorporated in the first embodiment of the present invention;

FIG. 12 is a side elevation view of the drag washer incorporated in the first embodiment of the present invention;

FIG. 13 is a cross-sectional view of the drag washer taken along line 13—13 in FIG. 12;

FIG. 15 is a side elevation view of the clutch sleeve incorporated in the second embodiment of the present invention;

FIG. 16 is a cross-sectional view of the clutch sleeve taken along line 16—16 in FIG. 15;

FIG. 17 is a cross-sectional view of the clutch sleeve taken along line 17—17 in FIG. 15;

FIG. 18 is a front elevation view of the clutch sleeve incorporated in the second embodiment of the present invention;

FIG. 19 is a side elevation view of the link incorporated in the second embodiment of the present invention;

FIG. 20 is a cross-sectional view of the link taken along line 20—20 in FIG. 19;

FIG. 21 is a cross-sectional view of the link taken along line 21—21 in FIG. 19;

FIG. 22 is a front elevation view of the link incorporated in the second embodiment of the present invention;

FIG. 23 is a front elevation view of the link incorporated in the second embodiment of the present invention;

FIG. 24 is a side elevation view of the drag washer incorporated in the second embodiment of the present invention; and FIG. 25 is a cross-sectional view of the drag washer taken along line 25—25 in FIG. 24.

DETAILED DESCRIPTION OF THE PREFERRED EMBODIMENTS

Figure 1:
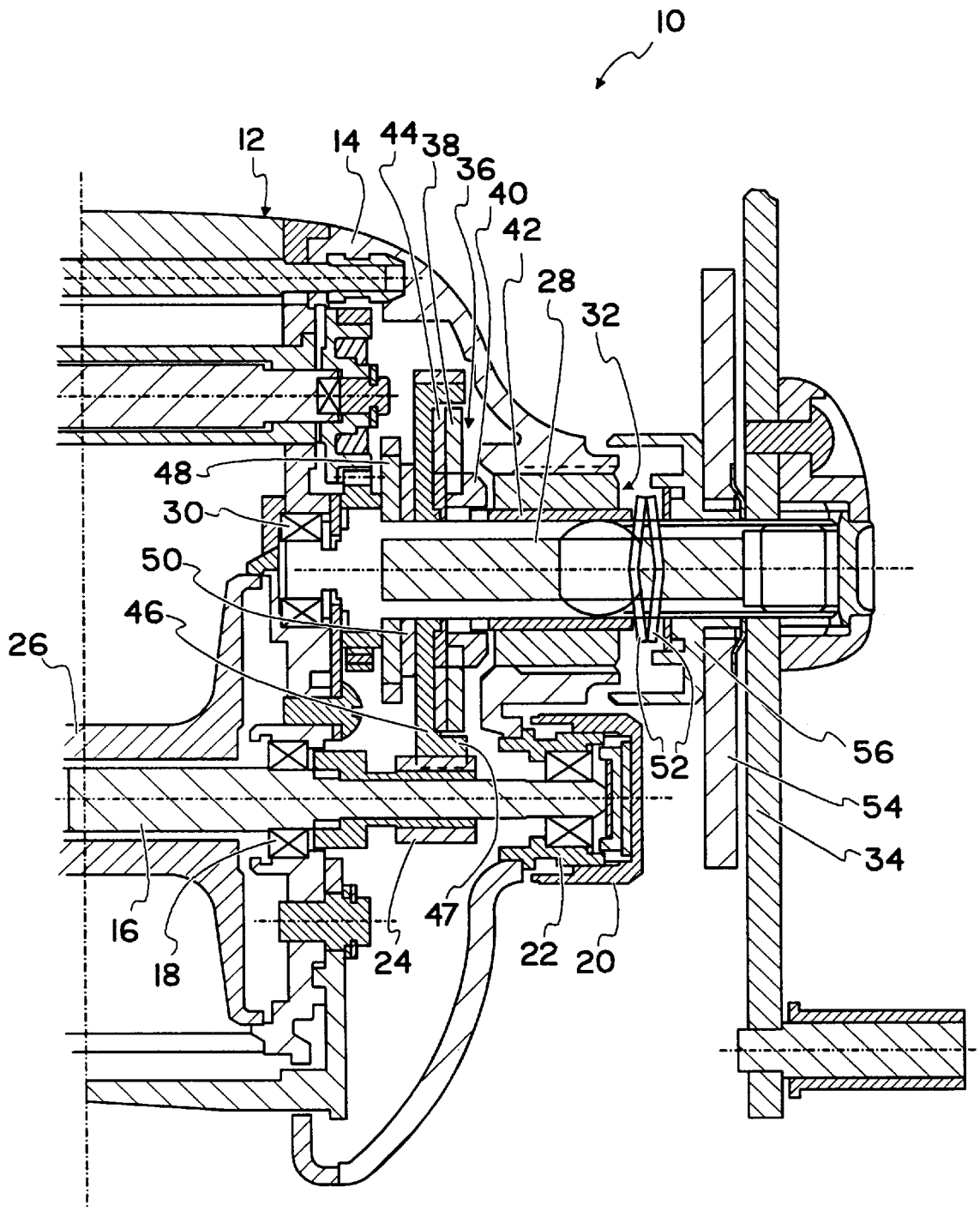
FIG. 1 is a plan view in vertical section of one half of a reel body incorporating a first embodiment of a drag mechanism according to the present invention and including a cooperating clutch sleeve, link and drag washer.
Figure 3:
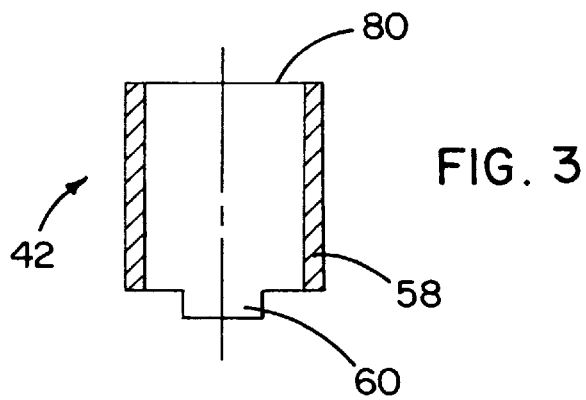
FIG. 3 is a cross-sectional view of the clutch sleeve taken along line 3—3 in FIG. 2.
Figure 2:
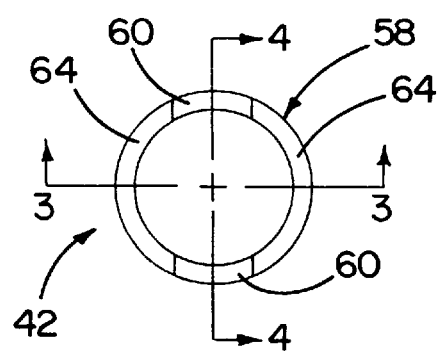
FIG. 2 is a side elevation view of the clutch sleeve incorporated in the first embodiment of the present invention.
Figure 4:
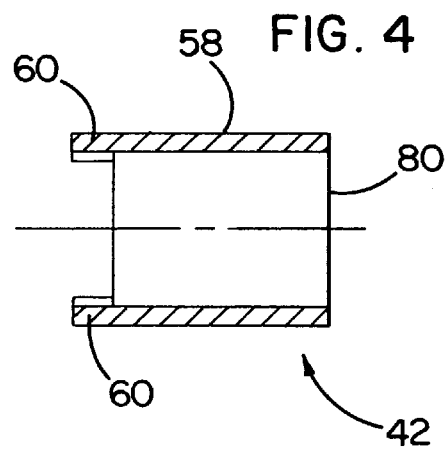
FIG. 4 is a cross-sectional view of the clutch sleeve taken along line 4—4 in FIG. 2.
Figure 5:
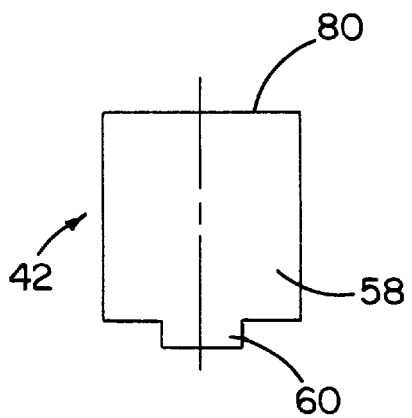
FIG. 5 is a front elevation view of the clutch sleeve incorporated in the first embodiment of the present invention.
Figure 6:
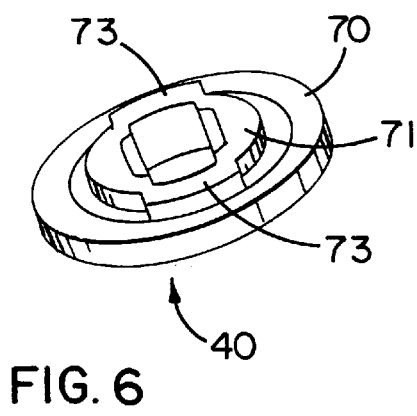
FIG. 6 is a perspective view of the link incorporated in the first embodiment of the present invention.

Referring to FIG. 1, a fishing reel 10, in this case a bait casting-type reel, suitable for incorporation of the present invention, is shown. It should be understood, however, that the present invention could be incorporated into other types of fishing reels.

The reel 10 consists of a frame 12 having laterally spaced side bodies (only one side body 14 is depicted in FIG. 1). A spool shaft 16 is mounted in bearings 18 (only one being shown) between the laterally spaced side bodies. A bearing cap 20 is threaded onto a lug 22 on the one side body 14 providing end thrust support to the spool shaft 16, as is well-known in the art. A driven pinion gear 24 is keyed to rotate with the spool shaft 16 and is axially slidable on the spool shaft 16. The driven gear 24 is operatively manipulated by a clutch system (not shown) that is well-known in the art. A spool 26 is mounted on the spool shaft 16 for carrying a supply of fishing line (not shown).

A crankshaft 28 is mounted for rotation on the frame 12 and is supported by the one side body 14 through bearings 30 at an inner end thereof and a one-way clutch mechanism 32 at an outer end thereof. A crank handle 34 is keyed on the end of the crankshaft 28, whereby rotating the handle 34 will rotate the crankshaft 28.

A drag mechanism, shown generally at 36, is mounted on the crankshaft 28, and in the embodiment shown in FIG. 1 includes a drag washer 38, a link 40 and a clutch sleeve 42. The link 40 is keyed on the crankshaft 28 and is only axially movable thereon. The drag washer 38 and the clutch sleeve 42 are axially movable on the crankshaft and are keyed to the link 40 at opposite sides thereof. The drag washer 38 includes a friction pad 44 facing axially and in friction-engaging contact with one face of a driving gear 46. The driving gear 46 includes an annular shoulder 47 defining an inner diameter. The friction pad 44 is mounted at or near the outer perimeter of the drag washer 38, with the diameter of the drag washer 38 substantially equal to the inner diameter of the driving gear 46. Accordingly, applying the lateral force to the driving gear 46 over substantially the outermost diameter of the drag washer 38, permits the application of a relatively large force to the driving gear 46 with a relatively minimal tightening torque.

The driving gear 46 is freely rotatably and axially movable on the crankshaft 28. The driving gear 46 meshes with the driven gear 24 on the spool shaft 16. A ratchet wheel 48 is secured to the crankshaft 28 so as to rotate with the crankshaft, but is prohibited from axial movement relative to the crankshaft 28. A friction pad 50 is mounted on an axial face of the ratchet wheel 48 for friction-engaging contact with the other face of the driving gear 46.

Belleville springs 52 encircle the crankshaft 28 at the outer end thereof with a drag-actuating knob, or star drag 54, threaded on the crankshaft 28. The drag-actuating knob 54 has a sleeve portion 56 bearing against one side of the belleville springs 52. The other side of the belleville springs 52 bears against the clutch sleeve 42.

Turning the drag-actuating knob 54 in one direction relative to the crankshaft 28 urges the belleville springs 52, clutch sleeve 42, link 40 and drag washer 38 against the driving gear 46 and ratchet wheel 48 to increase the captive force on the driving gear 46 between the link 40 and ratchet wheel 48, which are keyed to rotate with the crankshaft 28, to thereby cause the driving gear 46 to be slippingly held to the crankshaft 28 for rotation with the crankshaft 28. Turning the drag-actuating knob 54 in the opposite direction reduces the captive force on the driving gear 46.

Referring now to FIGS. 2–13, the operative relationship of the clutch sleeve 42, link 40 and drag washer 38 will now be described. The clutch sleeve 42 consists of a cylindrical shell 58 having a pair of legs 60 extending axially from an end thereof. In a preferred form, the legs 60 are diametrically opposed. The legs 60 of the clutch sleeve 42 are keyed in complementary recesses 62 formed in the link 40, whereby end portions 64 on the clutch sleeve 42 engage portions 66 on the link 40. The link 40 is keyed to the crankshaft 28 via flattened side walls 68 which engage corresponding side walls on the crankshaft.

The link 40 is generally disc-shaped having a hollow center portion. One face 69 of the link 40 is substantially flat and has a bevelled outer periphery. The other face of the link 40 includes an outer peripheral portion 70 and a raised middle portion 71, the two being generally separated by diametrically opposed recessed portions 72. The raised middle portion 71 includes a pair of radially extending legs 73 which are keyed in complementary recesses 74 formed in the drag washer 38, whereby outer peripheral portion 70 on the link 40 engages portion 78 on the drag washer 38.

Thus, turning the drag-actuating knob 54 in a drag tightening direction urges the belleville springs 52 against an end 80 of the clutch sleeve 42, which in turn forces portions 64 of the clutch sleeve 42 against portions 66 of the link 40, which in turn forces the outer peripheral portion 70 of the link 40 against portion 78 of the drag washer 38, and as a consequence increases the captive force on the driving gear 46. Since the lateral force is applied through the link 40 to the drag washer 38 over a large diameter area (diameter D in FIG. 12), a relatively large force may be applied to the driving gear 46 with a relatively minimal tightening torque supplied by the drag-actuating knob 54.

Rotation of the crankshaft 28 effectuates rotation of the link 40 via the keyed connection therebetween. Rotation of the link 40 in turn rotates the drag washer 38 via the keyed connection between the legs 73 and recesses 74 on the link 40 and drag washer 38, respectively, and also rotates the clutch sleeve 42 via the keyed connection between the legs 60 and recesses 62 on the clutch sleeve 42 and link, 40, respectively. Thus, the link 40 directly applies a turning force to the drag washer 38 without the need of a sufficient frictional force developed therebetween. Further, the clutch sleeve 42 applies an anti-reverse force, which is supplied to the clutch sleeve 42 from the one-way clutch mechanism 32, directly to the link 40 without the need of a frictional force developed therebetween.

Figure 14:
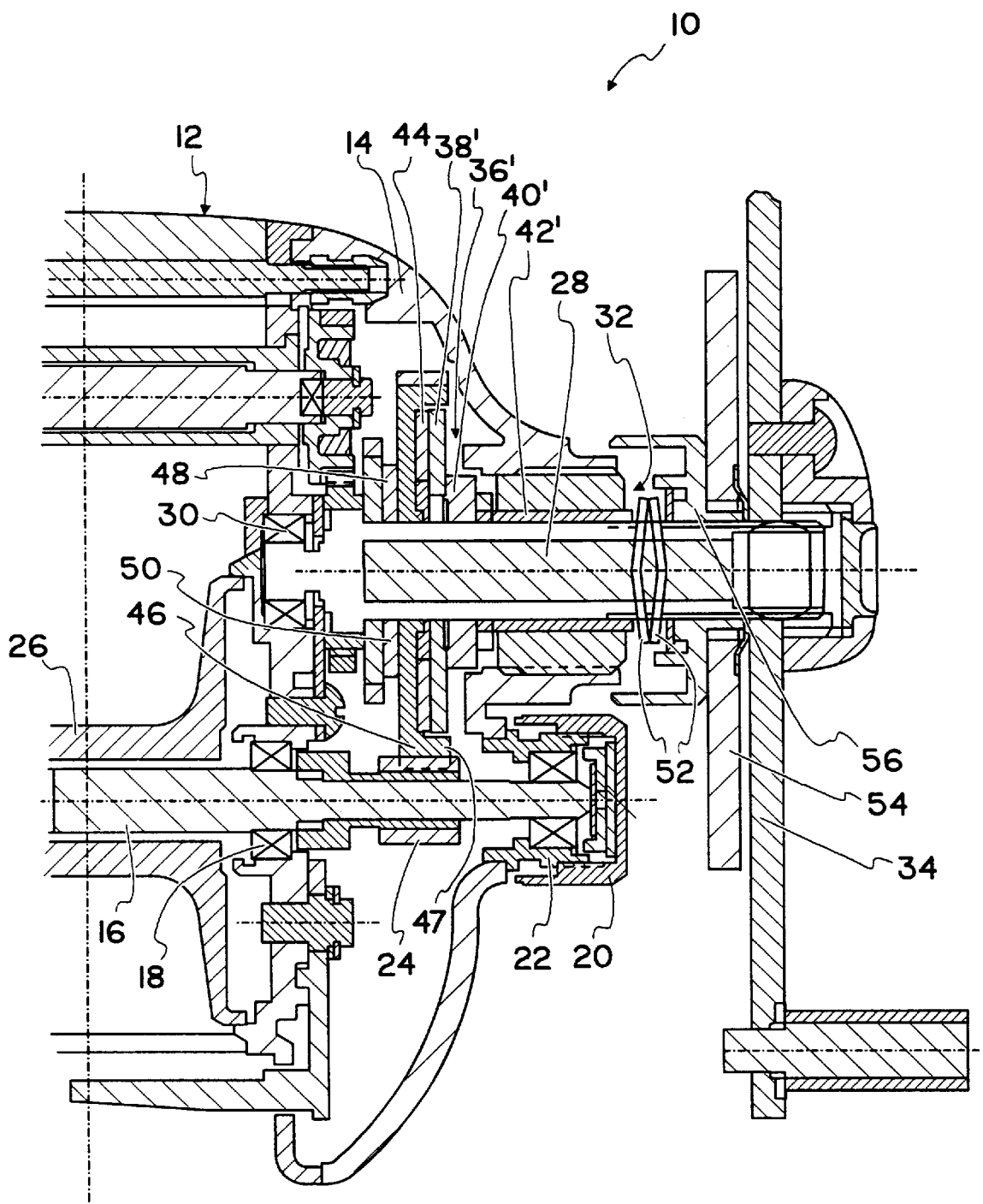
FIG. 14 is a plan view in vertical section of one half of a reel body incorporating a second embodiment of the drag mechanism according to the present invention and including a cooperating clutch sleeve, link and drag washer.

Referring now to FIG. 14, a second embodiment of the present invention will be described with like elements indicated by like reference numerals, and with modified elements corresponding to those previously described identified with a prime ('). The modifications have been made to the drag mechanism 36', and accordingly, the reel 10 operates according to the same general principles as previously described with respect to FIG. 1.

The drag washer 38' is keyed to the crankshaft 28 so as to rotate with the crankshaft 28, but is free to move axially relative to the crankshaft 28. As before, turning the drag-actuating knob 54 in a drag tightening direction urges the belleville springs 52 against the clutch sleeve 42', which in turn urges the clutch sleeve 42' against the link 40', which in turn urges the link 40' against the drag washer 38', which in turn urges the drag washer 38' against the driving gear 46 and ratchet wheel 48 to increase the captive force on the driving gear 46.

Similar to the first embodiment, the friction pad 44 is mounted to the drag washer 38' at or near its outer perimeter. The diameter of the drag washer 38' is substantially equal to the inner diameter of the driving gear 46, with the inner diameter defined by annular shoulder 47. Again, a relatively large force may be applied to the driving gear 46 with a relatively minimal tightening torque.

With respect to FIGS. 15–25, the drag mechanism 36' will be described in greater detail. The clutch sleeve 42' has a cylindrical shell 82 having recesses 84 cut out at an end thereof. In a preferred form, the recesses 84 are diametrically opposed.

The link 40' is generally a disc-shaped element 86 having a hollow center portion. Flat side walls 88 are formed in the hollow center portion and engage corresponding side walls on the crankshaft 28 to key the link 40' to the crankshaft 28. One face of the link 40' includes a pair of legs 90 extending therefrom. The legs 90 are received in the complementary recesses 84 on the clutch sleeve 42', whereby end portions 92 on the clutch sleeve 42' engage portions 94 on the link 40' when the two are placed in operative relationship. The other face of the link 40' includes an undercut annular shoulder 96. Surrounding the annular shoulder 96 is an outer peripheral portion 98 which abuts against a portion 100 of the drag washer 38' when the two are placed in operative relationship. The drag washer 38' is also keyed to the crankshaft 28 via flat side walls 102 which engage complementary side walls on the crankshaft 28.

Operation is as follows. Turning the drag-actuating knob 54 in a drag tightening direction urges belleville springs, 52 against an end 104 of the clutch sleeve 42', which in turn urges the portions 92 of the clutch sleeve 42' against the portions 94 of the link 40', which in turn urges the outer peripheral surface 98 of the link 40' against the portion 100 of the drag washer 38', which in turn forces the drag washer 38' and ratchet wheel 48 against the driving gear 46 to increase the captive force on the driving gear 46.

The lateral force applied to the drag washer 38' is applied over a relatively large diameter (diameter D' indicated in FIG. 24), to aid in maximizing the drag force applied to the driving gear 46 with a minimal amount of tightening torque supplied by drag-actuating knob 54.

The anti-reverse force caused by the one-way clutch mechanism 32 engaging the clutch sleeve 42' is supplied from the clutch sleeve 42' to the link 40' via the keyed connection between the recesses 84 and legs 90 on the clutch sleeve 42' and link 40', respectively.

In both embodiments, the clutch sleeve 42,42' is not keyed to the crankshaft 28, but rather includes a rounded hollow bore which permits the clutch sleeve 42,42' to rotate relative to the crankshaft 28. This results in a tighter and better feel as the reel 10 is operated by a user.

The foregoing disclosure of specific embodiments is intended to be illustrative of the broad concepts comprehended by the invention and is not to be construed as limiting. For instance, instead of mounting the friction pads 44,50 to the drag washer 38,38' and ratchet wheel 48, they may be mounted to the driving gear 46, or any combination between the ratchet wheel 48, driving gear 46 and drag washer 38,38'.

I claim:

1. In a fishing reel having a frame, a line-carrying spool rotatably mounted relative to the frame, a crankshaft rotatably mounted relative to the frame, a driving gear rotatably mounted relative to the crankshaft and selectively responsive to rotation of the crankshaft to drive the spool, and a drag mechanism for frictionally engaging the driving gear and causing the driving gear to slippingly follow rotation of the crankshaft, said drag mechanism comprising:

a drag washer mounted to the crankshaft and axially slidable thereon, said drag washer selectively frictionally engaging the driving gear;

a link keyed to the crankshaft for rotation therewith and axially slidable thereon, wherein said link includes a disc-shaped member having axially spaced, opposite faces, with one face of said link having a middle portion extending axially from said one face and an outer peripheral portion extending radially from said middle portion, wherein said outer peripheral portion of said link engages said drag washer such that only an annular portion of said one face of said link radially outwardly from said middle portion axially faces and engages said drag washer, said link keyed to said drag washer at said middle portion;

a clutch sleeve mounted to the crankshaft and axially slidable thereon, said clutch sleeve keyed to said link; and drag input means operably mounted on the crankshaft for inputting a drag force to said clutch sleeve, whereby said drag force is transferred from said clutch sleeve directly to said link, and from said link directly to said drag washer and applied to the driving gear to thereby cause the driving gear to be slippingly held to the crankshaft for rotation with the crankshaft.

2. The drag mechanism of claim 1, wherein said clutch sleeve includes a cylindrical shell having at least one leg extending axially therefrom, said at least one leg of said cylindrical shell received in at least one complementary recess formed in said link.

3. The drag mechanism of claim 1, wherein said link includes at least one leg extending axially from said one face at said middle portion, said at least one leg of said link received in at least one complementary recess formed in said drag washer.

4. The drag mechanism of claim 1, wherein said drag input means includes a drag-actuating knob threaded on the crankshaft for adjustably setting the drag force, and spring means provided between the drag-actuating knob and clutch sleeve for controllaby biasing said clutch sleeve toward the driving gear.

5. The drag mechanism of claim 4, wherein the spring means includes a pair of belleville springs.

6. The drag mechanism of claim 1, wherein the line-carrying spool is rotatably mounted relative to the frame about a first axis, and wherein the crankshaft is rotatably mounted relative to the frame about a second axis that is non-concentric with the first axis.

7. In a fishing reel having a frame, a line-carrying spool rotatably mounted relative to the frame, a crankshaft rotatably mounted relative to the frame, a driving gear rotatably mounted relative to the crankshaft and selectively responsive to rotation of the crankshaft to drive the spool, and a drag mechanism for frictionally engaging the driving gear and causing the driving gear to slippingly follow rotation of the crankshaft, said drag mechanism comprising:

a drag washer keyed to the crankshaft for rotation therewith and axially slidable thereon, said drag washer selectively frictionally engaging the driving gear;

a link having a bore through which the crankshaft extends and keyed to the crankshaft for rotation therewith and axially slidable thereon, wherein said link includes a disc-shaped member having axially spaced, opposite faces, with one face of said link including an annular shoulder extending axially from said one face, said annular shoulder defined by radially spaced inner and outer peripheral portions with said outer peripheral portion extending radially from said inner peripheral portion and said inner peripheral portion spaced radially from said bore, said annular shoulder selectively frictionally engaging said drag washer;

a clutch sleeve mounted to the crankshaft and axially slidable thereon, said clutch sleeve keyed to said link; and drag input means operably mounted on the crankshaft for inputting a drag force to said clutch sleeve, whereby said drag force is transferred from said clutch sleeve directly to said link, and from said link directly to said drag washer and applied to the driving gear to thereby cause the driving gear to be slippingly held to the crankshaft for rotation with the crankshaft.

8. The drag mechanism of claim 7, wherein said clutch sleeve includes a cylindrical shell having at least one axial recess in an end thereof, said at least one axial recess receiving at least one complementary leg extending axially from the other of the opposite faces of said link.

9. The drag mechanism of claim 7, wherein said drag input means includes a drag-actuating knob threaded on the crankshaft for adjustably setting the drag force, and spring means provided between the drag-actuating knob and clutch sleeve for biasing said clutch sleeve toward the driving gear.

10. A fishing reel comprising:

a reel frame;

a crankshaft rotatably supported to the reel frame;

a line-carrying spool mounted on a spool shaft rotatably mounted on the reel frame;

a driving gear rotatably mounted relative to the crankshaft to drive the spool and spool shaft; and a drag mechanism selectively frictionally engaging the driving gear and causing the driving gear to slippingly follow rotation of the crankshaft, said drag mechanism comprising:

a drag washer mounted to the crankshaft and axially slidable thereon, said drag washer selectively frictionally engaging the driving gear;

a link keyed to the crankshaft for rotation therewith and axially slidable thereon, wherein said link includes a disc-shaped member having axially spaced, opposite faces, with one face of said link having a middle portion extending axially from said one face and an outer peripheral portion extending radially from said middle portion, wherein said outer peripheral portion of said link engages said drag washer such that only an annular portion of said one face of said link radially outwardly from said middle portion axially faces and engages said drag washer, said link keyed to said drag washer at said middle portion;

a clutch sleeve mounted to the crankshaft and axially slidable thereon, said clutch sleeve keyed to said link; and drag input means operably mounted on the crankshaft for inputting a drag force to said clutch sleeve, whereby said drag force is transferred from said clutch sleeve directly to said link, and from said link directly to said drag washer and applied to the driving gear to thereby cause the driving gear to be slippingly held to the crankshaft for rotation with the crankshaft.

11. The fishing reel of claim 10, wherein said clutch sleeve includes a cylindrical shell having at least one leg extending axially therefrom, said at least one leg of said cylindrical shell received in at least one complementary recess formed in said link.

12. The fishing reel of claim 10, wherein said link includes at least one leg extending axially from said one face at said middle portion, said at least one leg of said link received in at least one complementary recess formed in said drag washer.

13. A fishing reel comprising:

a reel frame;

a crankshaft rotatably supported to the reel frame;

a line-carrying spool mounted on a spool shaft rotatably mounted on the reel frame;

a driving gear rotatably mounted relative to the crankshaft to drive the spool and spool shaft; and a drag mechanism selectively frictionally engaging the driving gear and causing the driving gear to slippingly follow rotation of the crankshaft, said drag mechanism comprising:

a drag washer keyed to the crankshaft for rotation therewith and axially slidable thereon, said drag washer selectively frictionally engaging the driving gear;

a link having a bore through which the crankshaft extends and keyed to the crankshaft for rotation therewith and axially slidable thereon, wherein said link includes a disc-shaped member having axially spaced, opposite faces, with one face of said link including an annular shoulder extending axially from said one face, said annular shoulder defined by radially spaced inner and outer peripheral portions with said outer peripheral portion extending radially from said inner peripheral portion and said inner peripheral portion spaced radially from said bore, said annular shoulder selectively frictionally engaging said drag washer;

a clutch sleeve mounted to the crankshaft and axially slidable thereon, said clutch sleeve keyed to said link; and drag input means operably mounted on the crankshaft for inputting a drag force to said clutch sleeve, whereby said drag force is transferred from said clutch sleeve directly to said link, and from said link directly to said drag washer and applied to the driving gear to thereby cause the driving gear to be slippingly held to the crankshaft for rotation with the crankshaft.

14. The fishing reel of claim 13, wherein said clutch sleeve includes a cylindrical shell having at least one axial recess in an end thereof, said at least one axial recess receiving at least one complementary leg extending axially from the other of the opposite faces of said link.

15. The fishing reel of claim 13, wherein the reel frame includes laterally spaced side bodies, with said spool shaft rotatably mounted between said laterally spaced side bodies and said crankshaft rotatably mounted to one of said laterally spaced side bodies.

* * * * *